Aug. 27, 1957  F. GALAVICS  2,804,269
OUTDOOR TEMPERATURE COMPENSATED CONTROL
APPARATUS FOR HEATING SYSTEMS
Filed Nov. 27, 1951
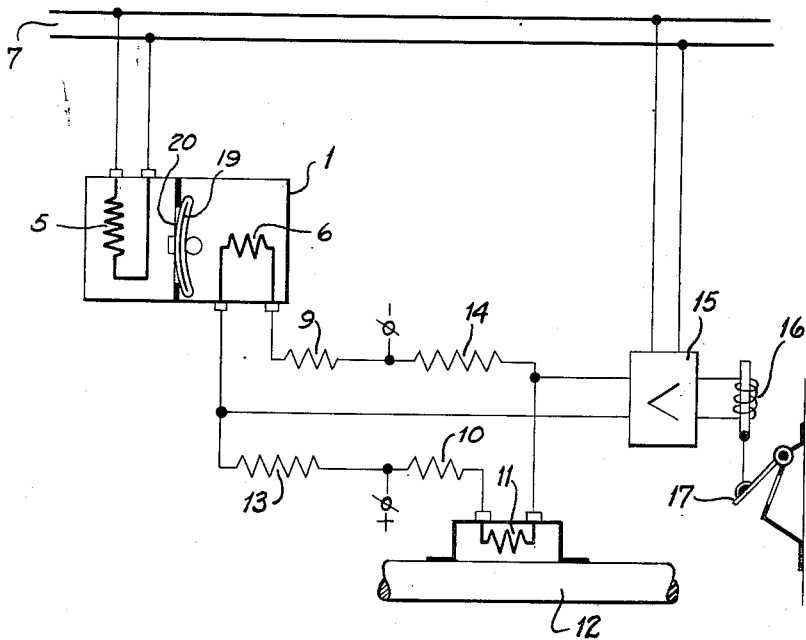
INVENTOR.
FRANZ GALAVICS
BY
Morgan, Finnegan, Durham & Pine
ATTORNEYS.

United States Patent Office 2,804,269
Patented Aug. 27, 1957

2,804,269

OUTDOOR TEMPERATURE COMPENSATED CONTROL APPARATUS FOR HEATING SYSTEMS

Franz Galavics, Zurich, Switzerland, assignor to Landis & Gyr, A. G., a body corporate of Switzerland Application November 27, 1951, Serial No. 258,389

Claims priority, application Switzerland November 29, 1950

1 Claim. (Cl. 236—91)

This invention relates to a novel control apparatus for heating systems adapted to be used in conjunction with a heating regulator for maintaining the room temperature of a building constant regardless of the outside temperature.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

An object of the present invention is to provide a novel control apparatus for heating systems adapted to be used in combination with a heating regulator to maintain constant temperature in a room in a highly efficient manner.

A further object of the present invention is to provide a novel control apparatus for heating systems which when subjected to changes in weather conditions is adapted to cooperate with a heating regulator to provide the necessary increase or decrease of heat necessary to maintain a room at a predetermined fixed temperature.

Another object of my invention is to provide a novel control apparatus for heating systems which is simple in design and cheap to produce.

The accompanying drawing, referred to herein and constituting a part hereof, illustrates an embodiment of the invention, and together with the description, serves to explain the principles of the invention.

The figure is a diagrammatic view of one embodiment of the control apparatus for heating systems in combination with a heating regulator.

In order to maintain a room at a constant temperature, a heating system is necessary to replace heat which is lost from the room to the outside air. Obviously, the greater the heat loss, the greater will be the amount of heat required to be supplied which in turn increases the operating expenses.

Apparatus has previously been designed for maintaining a constant temperature in a room by providing a heating system comprising a chamber in which there is a control apparatus which intermittently connects and disconnects an electric auxiliary heating apparatus.

As the heating losses increase in the chamber or in the room, the period of time for which the auxiliary heating device must be kept connected by means of the temperature control in order to maintain the temperature of the chamber at the desired temperature is increased. The heating control of this type of equipment is regulated by the temperature regulation of the control apparatus by means of impulses, the duration of said impulses varying proportionately to the weather conditions. Although the type of apparatus just described is very useful, it is quite complicated. On account of its elaborate construction, it is also quite expensive.

In order to provide a much simpler and less expensive heat-loss measuring device than previously known, I have invented a novel and most useful apparatus which is quite simple and yet highly efficient.

The present invention comprises a control apparatus for heating systems which is adapted to be used in combination with a heating regulator. The control apparatus comprises a chamber adapted to be exposed to the influence of the temperature of the outdoor elements, said chamber having contained therein a heating element and a thermoelement. The thermoelement is adapted to control a heating regulator, said heating regulator in turn supplying the necessary heat into the room to make up for the heat lost to the outdoors through the walls, windows, etc. of the room. The thermoelement is subjected to the outside temperature and is influenced by the heat coming from the heating element.

In order to describe the invention more specifically, reference is now made to the embodiment shown in the drawing. A chamber 1, to be subjected to the outside elements and having two separate compartments 2, 3 separated by a partition 4, is provided with a resistance 5 which serves as a heating element therefor. The resistance 5 is located in one compartment 2 and a thermoelement 6 is positioned in the other compartment 3. A variable thermal coupling is positioned between the compartments 2, 3 and in the illustrated embodiment takes the form of an opening 8 in the partition 4 which is controlled by a deformable closure 19 having a heat insulating layer 20 around it. The closure 19 and insulating layer 20 are so adjusted as to tightly seal off the resistance 5 from the thermoelement 6 when the outside temperature is equal to the desired room temperature so that the heating effect of the resistance is practically infinitesimal.

The resistance 5 is connected in series to the potential of a network 7. Connected to the thermoelement 6 is a measuring bridge of a heating regulator consisting of resistances 9, 10, 13 and 14, the thermoelement 6 being connected in series with the bridge resistance 9 in a branch of the measuring bridge, with the opposite branch of said measuring bridge being provided with a contact thermostat 11. The thermostat 11 is designed as a resistance thermoelement and is connected in series with the bridge resistance 10. The contact thermoelement 11 is positioned on a hot-water flow-pipe 12 of a heating plant, not otherwise shown.

Completing the measuring bridge, are the bridge resistances 13 and 14, said bridge resistances 13 and 14 lying opposite to each other, with bridge resistance 13 being connected to a source of bridge potential and bridge resistance 14 being connected to the input of an amplifier 15. Amplifier 15 controls a vertical magnet 16 for the control of a draft air flap 17 of a boiler, not otherwise shown.

As mentioned previously, the chamber 1 in use is exposed to the outside elements which include temperature of the air, force of wind, air humidity, sun radiation and heat radiation. The chamber, for example, may be attached to the outside wall of a building. Since the thermoelement 6 is held in the chamber 1, it too is subject to the outside elements as well as subject to the heating effects of the resistance 5.

The control apparatus of the present invention cooperates with the heating regulator as in the following manner. First, the desired room temperature is determined, and the thermal coupling is so adjusted that it seals off the resistance 5 from the thermoelement 6 at said desired room temperature as, for example, 20° C. so that said coupling is opened only when the bimetal 2 falls short of this temperature and is closed when it exceeds said room temperature.

The resistance 5 produces heat constantly, said resistance at the same time being subjected to outside weather conditions as the chamber is positioned outdoors.

At the same time, there is produced in the resistance thermoelement 6, a heating effect varying with the influences of the weather. As the outer temperature drops, the partition wall is so deformed that it releases air gaps between resistances 5 and 6, with the air which has been heated by resistance 5 passing through said gaps so that it reaches the area around the resistance thermoelement 6 and influences it. The additional heating effect increases as the outside temperature drops because the deformation of the bimetal partition wall and in the gaps become larger. With each resistance value of the resistance thermoelement 6 there is associated a resistance value of the contact thermostat 11 in such a way that the measuring bridge is in equilibrium, which is to say that the output current of the bridge is zero, so that a definite temperature of the contact thermostat 11 is coordinated with every temperature of the resistance thermoelement 6. This coordination is of such a nature that a decreasing temperature of the resistance thermoelement 6 corresponds to an increasing temperature of the contact thermostat 11. The correct quantitative coordination of the two temperatures at which the hot water flow temperature is such that the heat supply to the heated rooms corresponds to the heat requirement at the corresponding outside and other weather conditions, is established by the selection of the bridge resistances 9, 10, 13 and 14.

Now, if the hot water flow temperature does not correspond to the outside temperature and the other weather conditions, the balance of the bridge is disturbed, and a control potential appears at the amplifier input, which potential, amplified by the amplifier 15, controls the vertical magnet 16 in such a manner that at too low a flow temperature the magnet opens the draft air flap 18 and vice versa, so that the desired regulation process is attained.

The measuring bridge of the heating regulator may be replaced by a differential or any other equivalent apparatus. Likewise, the control apparatus may serve not only to actuate the draft air flap, but also be used to control automatic switch devices, relays, electric blowers, relays for automatic oil furnaces, engine switching mechanisms, mixing valves, throttle flaps, engine valves, etc.

Other modifications than shown in the drawing may be used to influence the thermoelement 6 by means of a heating effect changing with the weather conditions.

By my novel apparatus as described previously and shown in different embodiments, it is possible to obtain control apparatus for heating systems which acts instantly with a heating regulator to maintain a constant room temperature. The instant said control apparatus is effected by a change in weather conditions, the heating regulator operates to decrease or increase the necessary heat to be supplied to the room in order to maintain a constant room temperature. Although the apparatus of my invention is relatively simple in construction, it is highly efficient and is a decided advance over anything known by me in the field.

The invention in its broader aspects is not limited to the specific mechanisms described but departures may be made therefrom within the scope of the accompanying claim without departing from the principles of the invention and without sacrificing its chief advantages.

I claim:

A control apparatus for heating systems adapted to be used in combination with a heating regulator having a control circuit whereby the room temperature of a building may be maintained constant, said control apparatus comprising a chamber having two compartments and a connecting opening therebetween, said chamber being exposed to the elements of the outside atmosphere, a temperature-responsive variable electrical resistance in one compartment of the chamber connected in the control circuit of the heating regulator, and heating means in the other of said compartments for maintaining a given point in the chamber at a particular temperature comprising a bimetal member positioned so as to control the connecting opening between the compartments, the output of said heating means being proportional to the heat loss of the chamber to the atmosphere and being directed at the bimetal element controlling the connecting opening and the electrical resistance.

References Cited in the file of this patent

UNITED STATES PATENTS

| | | |
|---|---|---|
| 2,057,309 | Persons | Oct. 13, 1936 |
| 2,137,059 | Moreau | Nov. 15, 1938 |
| 2,192,144 | Miller | Feb. 27, 1940 |
| 2,375,988 | Gillee et al. | May 15, 1945 |
| 2,474,798 | Amsler | June 28, 1949 |
| 2,547,933 | Fitzgerald | Apr. 10, 1951 |
| 2,553,060 | Miner | May 15, 1951 |
| 2,564,416 | Wildhack | Aug. 14, 1951 |
| 2,603,422 | Sargeauent | July 15, 1952 |

FOREIGN PATENTS

| | | |
|---|---|---|
| 777,297 | France | Nov. 26, 1934 |